United States Patent
Schneider et al.

(10) Patent No.: US 10,816,048 B2
(45) Date of Patent: Oct. 27, 2020

(54) WORK APPARATUS HAVING AN ELECTROMAGNETIC BRAKE ASSEMBLY

(71) Applicant: Andreas Stihl AG & Co. KG, Waiblingen (DE)

(72) Inventors: Michael Schneider, Fellbach (DE); Felix Mayer, Waiblingen (DE); Tobias Deigendesch, Backnang (DE); Sebastian Hanussek, Remseck (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 316 days.

(21) Appl. No.: 15/997,327

(22) Filed: Jun. 4, 2018

(65) Prior Publication Data
US 2018/0355930 A1  Dec. 13, 2018

(30) Foreign Application Priority Data

Jun. 9, 2017  (EP) .................................... 17400036

(51) Int. Cl.
| | |
|---|---|
| *B27B 5/38* | (2006.01) |
| *F16D 63/00* | (2006.01) |
| *B23D 45/16* | (2006.01) |
| *B23D 47/12* | (2006.01) |
| *F16D 59/00* | (2006.01) |
| *F16P 3/00* | (2006.01) |
| *B23Q 5/10* | (2006.01) |
| *B25F 5/00* | (2006.01) |

(52) U.S. Cl.
CPC ........... *F16D 63/002* (2013.01); *B23D 45/16* (2013.01); *B23D 47/12* (2013.01); *B27B 5/38* (2013.01); *F16D 59/00* (2013.01); *F16P 3/00* (2013.01); *B23Q 5/10* (2013.01); *B25F 5/001* (2013.01)

(58) Field of Classification Search
CPC ....... F16D 63/002; F16D 59/00; B23D 45/16; B23D 47/00; B23D 47/12; B23D 47/123; B23D 47/126; B27B 5/38; B27B 17/083; B27B 9/00
USPC ....................................................... 173/156
See application file for complete search history.

(56) References Cited

U.S. PATENT DOCUMENTS

| | | | |
|---|---|---|---|
| 4,402,138 A | 9/1983 | Gloeckle et al. | |
| 4,432,139 A | 2/1984 | Koehler et al. | |
| 4,573,556 A | 3/1986 | Andreasson | |
| 4,683,660 A * | 8/1987 | Schurr | B27B 17/083 30/381 |

(Continued)

*Primary Examiner* — Chelsea E Stinson
(74) *Attorney, Agent, or Firm* — Walter Ottesen, P.A.

(57) ABSTRACT

A work apparatus has a work tool driven by a combustion engine. A brake assembly has a brake element for braking the work tool as it slows down. In a braking position of the brake assembly, the work tool is braked, while, in a stand-by position of the brake assembly, the brake element enables the movement of the work tool. The brake element is held in the stand-by position by a holding force from an electromagnet supplied with energy by an electric generator driven by the engine, for which purpose, in the stand-by position of the brake assembly, a holding current is supplied to the electromagnet. To extend the holding time as the engine slows down, an operating parameter of the engine is monitored and, after a limit value of the operating parameter is reached, the holding current supplied to the electromagnet is reduced.

14 Claims, 2 Drawing Sheets

(56) References Cited

U.S. PATENT DOCUMENTS

| | | | | |
|---|---|---|---|---|
| 4,753,012 A * | 6/1988 | Schurr | ................ | B27B 17/083 |
| | | | | 188/77 R |
| 4,920,649 A * | 5/1990 | Strom | ................... | B27B 17/083 |
| | | | | 30/382 |
| 9,656,336 B2 * | 5/2017 | Petersson | ............... | B23D 47/12 |
| 10,668,545 B2 * | 6/2020 | Willgert | ................. | B27B 17/00 |
| 10,675,694 B2 * | 6/2020 | Hanussek | ................ | B27B 5/38 |
| 2010/0257743 A1 | 10/2010 | George | | |
| 2011/0001102 A1* | 1/2011 | Hossler | ................... | B66D 5/10 |
| | | | | 254/322 |
| 2011/0186319 A1 | 8/2011 | Pellenc | | |
| 2015/0151447 A1* | 6/2015 | Petersson | ............... | B25F 5/006 |
| | | | | 30/381 |
| 2017/0072482 A1 | 3/2017 | Hanussek et al. | | |
| 2018/0355930 A1* | 12/2018 | Schneider | .............. | F16D 59/00 |

\* cited by examiner

WORK APPARATUS HAVING AN ELECTROMAGNETIC BRAKE ASSEMBLY

CROSS REFERENCE TO RELATED APPLICATION

This application claims priority of European patent application no. 17 400 036.4, filed Jun. 9, 2017, the entire content of which is incorporated herein by reference.

FIELD OF THE INVENTION

The invention relates to a work apparatus with a work tool, the work tool being driven by a combustion engine. A brake assembly is provided for braking the slowing-down work tool, the brake assembly having a brake element which brakes the tool. In a braking position of the brake assembly, the brake element brakes the work tool while, in a stand-by position of the brake assembly, the brake element releases the movement of the work tool.

BACKGROUND OF THE INVENTION

The brake element is held in the stand-by position with a holding force supplied by an electromagnet. The energy for operating the electromagnet is supplied by an electric generator driven by the combustion engine, and therefore, in the stand-by position of the brake assembly, a holding current can be supplied to the electromagnet.

The size of the holding current of the electromagnet is selected such that the electromagnet supplies a sufficiently high holding force which reliably avoids an unintentional triggering of the brake assembly during operation. The current strength is selected in such a manner that the holding force is of a size such that, even in the event of vibrations of the work apparatus, and in the event of shocks and impacts, triggering of the brake assembly is reliably avoided.

If the work apparatus is turned off and the combustion engine is switched off, the electric generator driven by the combustion engine initially still delivers energy for operating the electromagnet. As the rotational speed of the slowing-down combustion engine drops, the generator voltage also drops until, when a critical rotational speed is reached, the generator can no longer supply the necessary energy for maintaining the holding current. The holding current breaks down, and the electromagnet releases the brake assembly. After the holding current falls away, the brake assembly will change from the stand-by position into the braking position under the effect of a resetting force, as a result of which the brake element applies and brakes the slowing-down work tool. The braking operation of the slowing-down braking is already triggered at a still relatively high slowing-down rotational speed since the generator can no longer supply the high holding current at the slowing-down rotational speed. The brake assembly is subject to corresponding wear.

SUMMARY OF THE INVENTION

It is an object of the invention to provide a work apparatus having an electromagnetically held brake assembly in such a manner that the brake assembly wear arising due to slowing-down braking is reduced.

According to a feature of the invention, after the combustion engine is switched off, an operating parameter of the combustion engine is monitored. After a limit value of the monitored operating parameter is reached, the holding current supplied to the electromagnet from the energy store is reduced.

Because of the reduction of the holding current, the electrical energy supplied to the electromagnet is reduced. As the combustion engine slows down, a reduced holding current can be maintained for a longer time by the energy store than a non-reduced holding current. Since a large holding current is selected during operation so that, for example, strikes, impacts and vibrations also do not lead to triggering of the brake assembly, a lower holding current as the combustion engine is slowing down will not immediately lead to triggering of the brake assembly. A slowing-down work apparatus is carried, for example, by the user, and therefore the holding force for the brake assembly can be selected to be fundamentally lower since, for example, no strikes and impacts will occur. By means of the reduction of the holding current, the energy required by the electromagnet is therefore reduced. By means of the reduction of the holding current, even at a lower rotational speed of the slowing-down combustion engine, a resulting lower generator voltage is still sufficient to keep the electromagnet in operation and to supply a—smaller—holding force. As a result, the brake assembly for braking the decelerating or slowing-down work tool will engage later. Since, during the later engagement of the brake, less energy gets stuck in the system and therefore less braking has to be undertaken, the wear per slowing-down braking action is lower; the service life of the brake assembly becomes longer.

By the later engagement of the brake assembly as the work tool slows down, there are lower rotational speeds of the work tool when the brake assembly is triggered. Overall, with a later braking time, less energy has to be consumed by the braking.

In particular, the work tool does not have a battery for storing the energy. The full supplying of energy to the work apparatus is supplied via a generator. Even during starting, electrical energy is initially not available to the combustion engine. Only when the crankshaft rotates will the generator supply sufficient energy to hold the brake assembly in a manner released by the holding magnet, that is, to hold same in its stand-by position.

The rotational speed of the combustion engine is preferably used as an operating parameter. The rotational speed of the combustion engine can be determined in a simple manner by the zero passages of the alternating voltage generated by the generator.

The operating parameter can also be the amplitude of the starting voltage of the generator. When the rotational speed drops, the amplitude of the starting voltage of the generator drops, and therefore, after a limit value of the amplitude is reached, or, after a limit value of the amplitude is fallen short of, the holding current supplied to the electromagnet is reduced.

During operation, a holding current can be within a range of between 30 mA to 1000 mA. The holding current particularly preferably lies between 50 mA and 300 mA, in particular at 185 mA. It is preferably provided to reduce the holding current as a function of the rotational speed in the form of a negatively falling ramp. In particular, the slope of the ramp is determined as a quotient of a parametrizable current difference from a parametrizable rotational speed difference.

It can be expedient to reduce the holding current in steps. A step is advantageously held for a predetermined period, in particular for a predetermined period of at least 5 ms.

In a preferred embodiment of the invention, the electrical energy output by the generator is temporarily stored in an energy store. The holding current for the electromagnet is fed from the energy store. An energy store of this type is advantageously a capacitor. After the combustion engine is switched off, the electrical energy flowing to the energy store will become smaller than the electrical energy flowing out of the energy store to the electromagnet.

A desired holding time of the electromagnet after the combustion engine is switched off can be predetermined by selection of the capacity of the energy store.

The work tool is driven by a combustion engine, wherein the drive has a drive element on which the brake element acts. The drive element is expediently the clutch drum of a centrifugal clutch. The brake element acts here with the effect of a contact force on the drive element. A contact force of this type is expediently provided by a brake spring.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
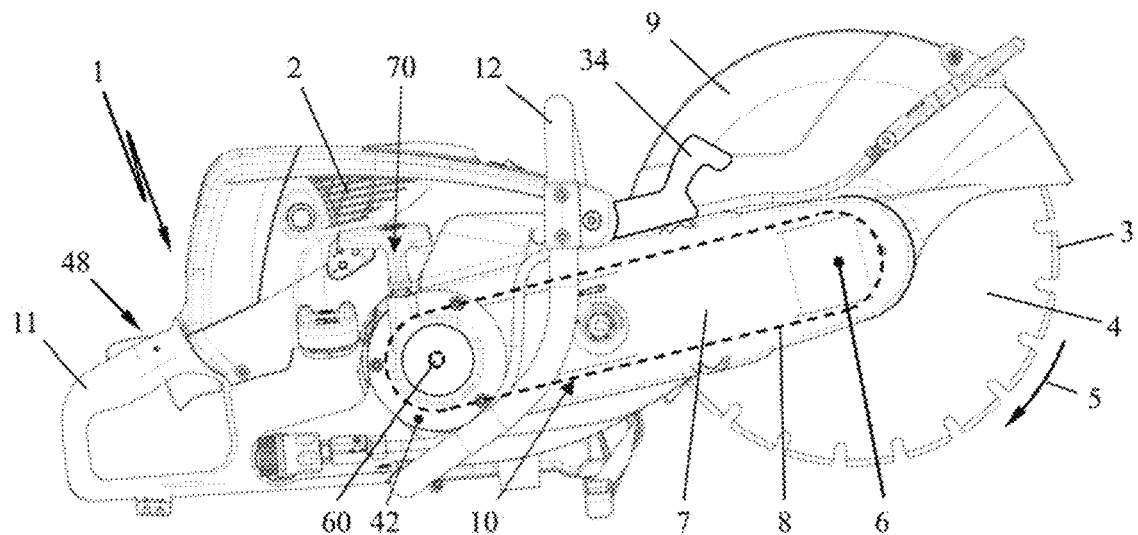
FIG. 1 shows a side view of a handheld work apparatus using the example of a cutoff machine.
Figure 3:
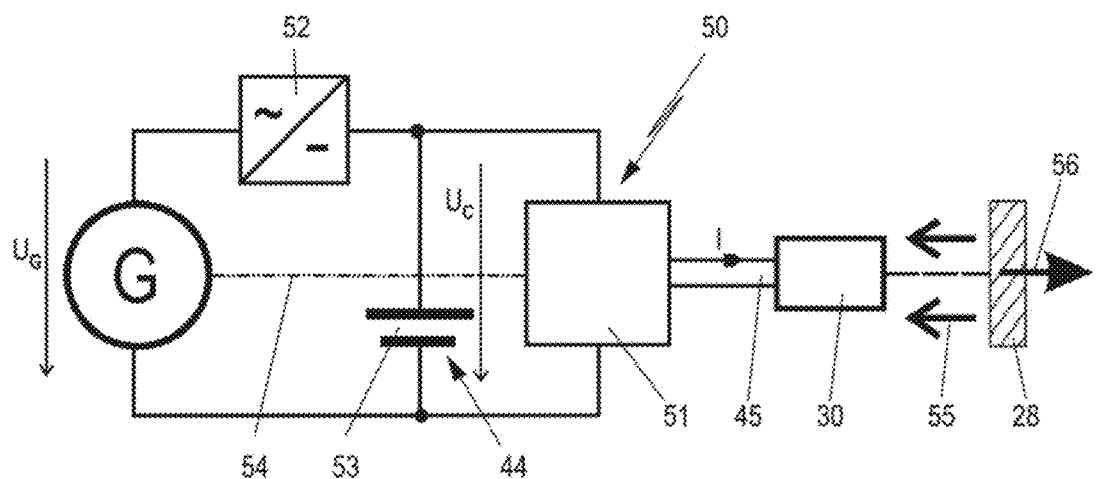
FIG. 3 shows a schematic circuit diagram for operating the electromagnet for holding a brake element in the stand-by position; and, FIG. 4 shows a diagram illustrating the falling holding current as the rotational speed falls.

The handheld work apparatus 1, which is especially portable, shown in FIG. 1 is a cutoff machine having a combustion engine 2 for driving a work tool 3. In the embodiment shown in the form of a cutoff machine, the work tool 3 is configured as a cutting disc 4. The work tool 3 is driven in a rotational direction 5 about a rotational axis 6. The work apparatus 1 can also be another handheld work apparatus, for example a brush cutter with a knife blade as work tool, a motorized chainsaw having a saw chain as work tool or else another handheld work apparatus with a corresponding construction. The combustion engine 2 of the work apparatus 1 is started by a pull-rope starter 70. The work apparatus 1 does not have a battery or similar components for storing electrical energy. The supplying of the work apparatus 1 with energy takes place exclusively via an electric generator G driven by the crankshaft of the combustion engine 2 (FIG. 3). In particular during starting, initially no electrical energy is available to the combustion engine 2. Only when the crankshaft rotates will the generator G supply energy in order, for example, to operate a control unit 51. The control unit 51 can be connected to the generator G via an electric connecting line 46.

Figure 2:
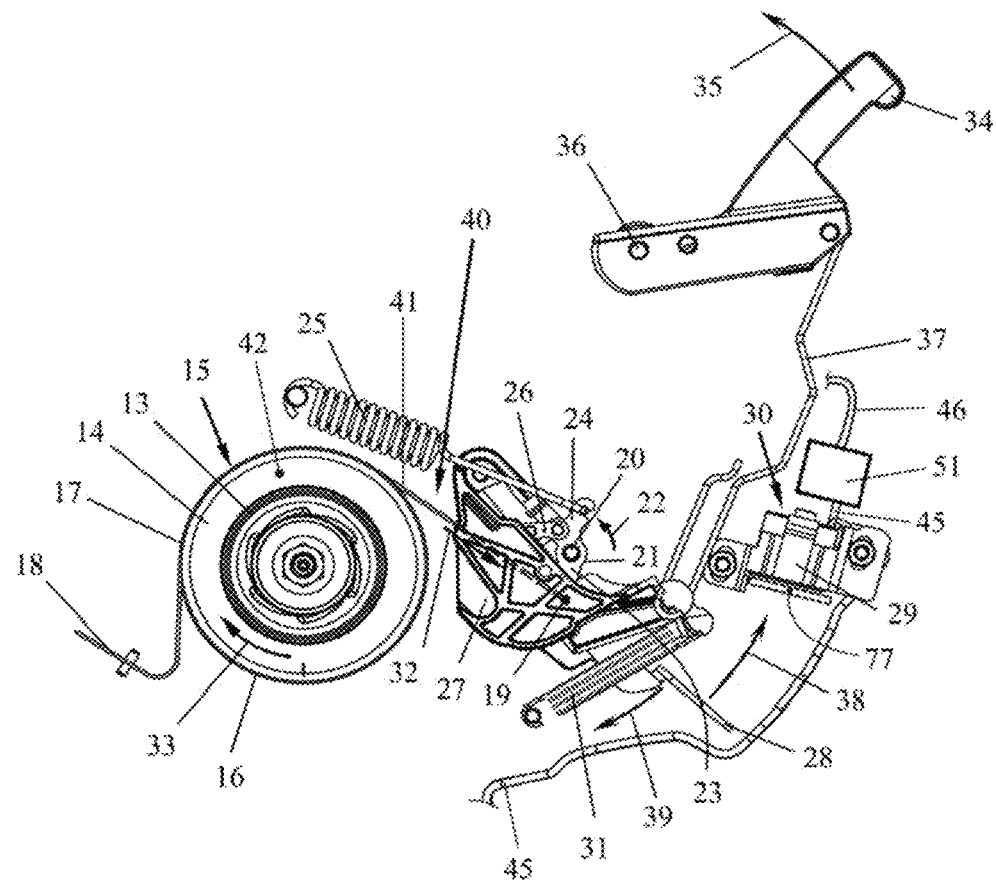
FIG. 2 shows a schematic illustration of a brake assembly of the handheld work apparatus according to FIG. 1.

In the embodiment, the work tool 3 is held on an outrigger or a cantilever 7 in which a drive 10 for the work tool 3 is accommodated. In the case of a cutoff machine, the drive 10 can be configured as a belt drive 8 which loops around a drive disc 13 (FIG. 2). The drive disc 13 is driven by the combustion engine 2 via a clutch, especially a centrifugal clutch 15. The work tool 3 is covered over by a protective cover 9. For holding and guiding the work apparatus 1, a front bale-like handle 12 and a rear handle 11 are provided in the embodiment shown. Operator controlled elements 48 for operation of the combustion engine 2 are arranged in the rear handle 11.

The drive disc 13 (FIG. 2) is secured on a clutch drum 14 of a centrifugal clutch 15 for rotation therewith. The drive disc 13 together with the clutch drum 14 forms a drive element 42 for the drive 10. The drive element 42 is driven by the combustion engine 2.

As FIG. 2 shows, the clutch drum 14 at the same time forms a brake drum 16 for a brake assembly 40, which brake assembly interacts with a brake element 41. In the embodiment shown, the brake element 41 is formed by a brake band 17 which loops around the outer circumference of the brake drum 16. The looping angle of the brake band 17 is preferably more than 360°. FIG. 2 shows the brake assembly 40 in a braking position in which the brake element 41 in the form of the brake band 17 is applied to the brake drum 16. In the braking position, the brake band 17 lies against the clutch drum 14. When the brake band 17 is applied, the brake band 17 brakes the clutch drum 14, and the work tool 3 is not driven. If the brake band 17 does not lie against the brake drum 16 or the clutch drum 14, that is, there is play between the clutch drum 14 and the brake band 17, the clutch drum 14 can rotate and the work tool 3 can be driven.

The brake band 17 is secured with its first end 18 in a manner fixed on the housing. The second end 19 of the brake band 17 is secured on a brake lever 20. The brake lever 20 is pivotable in the direction of the arrow 22 and in the opposite direction about a rotational axis 21 fixed on the housing. The brake lever 20 is a substantially two-armed lever. The second end of the brake band 17 is secured on the one lever arm 23 of the brake lever 20. A brake spring 25 acts on the other lever arm 24 of the brake lever 20 and attempts to pivot the brake lever 20 in the arrow direction 22.

The brake lever 20 is advantageously supported on a trigger lever 27 via a knee lever arrangement 26. The trigger lever 27 bears a holding plate 28 to which a holding device 29 is assigned. In the embodiment shown, the holding device 29 is formed by an electromagnet 30. In the embodiment shown, the holding plate 28 does not lie against the electromagnet 30. The holding plate 28 is preferably composed of a magnetic or magnetizable material, preferably of a steel plate. When the electromagnet 30 is energized, the steel plate is attracted by the magnetic field of the electromagnet 30. The holding position 77 of the holding plate 28 is illustrated by dashed lines in FIG. 2. The electromagnet 30 is connected to the control unit 51 via a connecting line 45 (FIG. 3).

The trigger lever 27 can be acted upon with a resetting force 56 which is advantageously supplied by a trigger spring 31 and acts in the braking position shown in FIG. 2. If the holding current I (FIG. 3) of the electromagnet 30 is switched off, the trigger lever 27 can pivot under the effect of the tensile force of the trigger spring 31 into the release position, which is shown in FIG. 2.

In the braking position of the brake assembly 40, the trigger lever 27 releases the knee lever arrangement 26 such that the brake lever 20 can be pivoted under the effect of the brake spring 25 in the arrow direction 22. As a result, a tensile force is exerted on the brake band 17 in the arrow direction 32, and therefore the brake band 17 is applied with a contact force against the outer circumference of the brake drum 16 and brakes the latter. The drive disc 13 or the drive element 42 is thereby braked and—via the drive 10—the work tool 3 is stopped.

In a preferred embodiment the trigger spring 31 can be omitted, as illustrated by broken lines in FIG. 2. The knee lever arrangement 26 is changed in its arrangement and shifted in the "triggering direction" in such a manner that, without an additional trigger spring, when the holding current I of the electromagnet 30 is switched off, the knee lever arrangement 26 immediately triggers and the brake lever 20 pivots under the effect of the brake spring 25 in the arrow direction 22. The brake band 17 is applied with a contact force against the brake drum 16. In this embodiment, the resetting force 56 is supplied, for example, by the brake spring 25.

During operation, the brake drum 16 or the clutch drum 14 rotates in the arrow direction 33 such that, by means of the selected arrangement of the brake band 17, automatic reinforcement of the braking effect occurs in the event of braking. The brake band 17 is pulled tight because of the rotation of the brake drum 16 in the arrow direction 33 and is placed fixedly against the brake drum 16.

For the release of the applied brake assembly 40 according to FIG. 2, an actuating lever 34 is provided which is to be pivoted in the arrow direction 35 about a housing-mounted bearing axis 36. In the process, the trigger lever 27 is carried along in the arrow direction 38 via a connecting rod 37 and the holding plate 28 is placed against the electromagnet 30. If the electromagnet 30 is energized with a holding current, the electromagnetic force of the electromagnet 30 will hold the holding plate 28 in the holding position 77 (shown by dashed lines) on the electromagnet 30. In the holding position 77 of the holding plate 28, the trigger lever 27 has been pivoted in the arrow direction 38 and has returned the knee lever arrangement 26 into a stand-by position of the brake assembly 40. The brake lever 20 is pivoted counter to the arrow direction 22, as a result of which the brake band 17 is shifted counter to the arrow direction 32, and therefore the brake band 17 lifts off the brake drum 16. The brake drum 16 and therefore the clutch drum 14 are released for rotation. The combustion engine 2 can drive the work tool 3 via the connected centrifugal clutch 15 and the drive 10. The brake assembly 40 is in its stand-by position.

The brake assembly 40 is advantageously brought by the user from the braking position into the stand-by position via the actuating lever 34. For this purpose, the user moves the actuating lever 34 in the arrow direction 35, advantageously counter to a resetting force 56 of the brake assembly 40. If the user has pivoted the holding plate 28 in the vicinity of the energized electromagnet 30, the holding plate 28 is attracted (holding position 77), and the brake assembly 40 is held in the stand-by position by the electromagnet 30. If the electromagnet 30 is not energized or is not sufficiently energized, the holding plate 28 will pivot back as long as the user no longer holds the actuating lever 34 or no longer pulls same in the arrow direction 35.

The electromagnet 30 is illustrated in the schematic circuit diagram 50 (FIG. 3). The electromagnet 30 is fed with energy by the generator G, wherein the generator G is driven by the combustion engine 2 (FIG. 1). The generator G will output a generator voltage $U_G$ when the crankshaft 60 of the combustion engine 2 rotates (FIG. 1). The electromagnet 30 will hold the holding plate 28 in the holding position 77 (FIG. 2) until the slowing-down combustion engine 2 reaches a rotational speed n at which the generator voltage $U_G$ has fallen away to such an extent that the holding current I can no longer be maintained. Due to the holding current I having fallen away, the holding plate 28 can no longer be held in the holding position 77. As a result, the holding plate 28 pivots back in the arrow direction 39 towards its starting position. The brake band 17 is placed against the clutch drum 14, and the drive is braked. The work tool 3 comes to a standstill.

Figure 4:
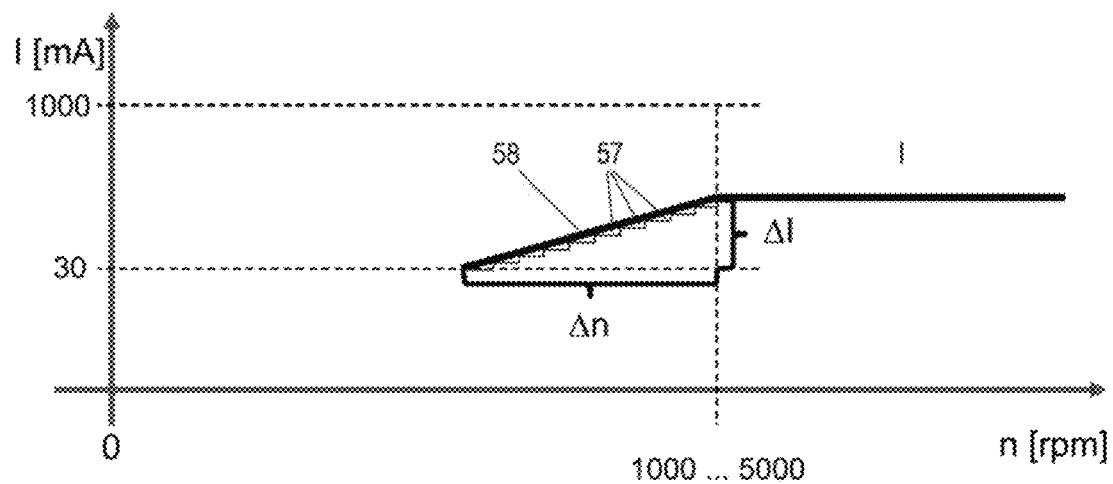

As FIG. 3 shows, the generator voltage $U_G$ is rectified by means of a rectifier 52 and the electrical energy is temporarily stored in an energy store 44. The holding current I which is supplied to the electromagnet 30 is taken from the energy store 44. In the embodiment, the energy store 44 is configured as a capacitor 53; the capacitor 53 is charged up by the rectified generator voltage $U_G$. The capacitor voltage $U_C$ feeds a control unit 51 which is connected to the electromagnet 30 via a connecting line 45 and monitors and regulates the holding current I to the electromagnet 30. It is provided according to the invention that the control unit 51 changes the holding current I and, after the combustion engine 2 has been switched off, reduces the holding current in a predetermined manner in steps 57 (FIG. 4) or continuously in accordance with a ramp 58 (FIG. 4).

If, after operation of the combustion engine 2, the latter is switched off, the rotational speed of the combustion engine 2 will fall away. If the slowing-down speed of the combustion engine 2 drops below the engagement speed, the centrifugal clutch 15 opens. The combustion engine 2 is decoupled from the work tool 3. The work tool 3 continues to rotate because of its rotating mass and the inertia.

As the combustion engine 2 slows down, the generator G will output a generator voltage $U_G$, which slowly becomes smaller, but will continue to charge the capacitor 53. The energy is taken from the capacitor 53 in order to energize the electromagnet 30 with the holding current I.

If the slowing-down speed n of the combustion engine 2 reaches a limit value of, for example 1000 rpm or if the slowing-down speed of the combustion engine 2 falls below the predetermined limit value, this is recognized by the control unit 51. For this purpose, the control unit 51 can be connected to the generator G via a suitable signal line 45 in order to sense the rotational speed of the generator, for example as an operating parameter of the combustion engine 2.

When the limit value of the operating parameter is reached, in the embodiment the slowing-down speed of the combustion engine 2, or, if the limit value is fallen short of, the holding current I supplied to the electromagnet 30 is reduced in steps. It can also be advantageous for the holding current to be reduced continuously. The electromagnetic holding force 55 becomes smaller as the holding current I becomes smaller. However, a smaller holding force does not lead to an immediate pivoting or release of the holding plate 28 from the electromagnet 30. The holding force 55 initially remains larger than a resetting force 56, for example of the trigger spring 31, acting in the arrow direction 39. In other words, as the combustion engine 2 slows down, the energy supplied to the electromagnet 30 is reduced. However, the reduced energy suffices to hold the holding plate 28 in the holding position 77, in particular without the action of relatively strong factors, such as, for example, vibrations or impacts. When the combustion engine 2 slows down, impacts and vibrations occur in only a smaller extent than in the working mode, and therefore a smaller amount of holding energy is still sufficient as the combustion engine 2 slows down.

FIG. 4 shows the holding current within a range of 30 mA to 300 mA. A holding current I of, for example, 185 mA is reduced by an amount ΔI via a rotational speed Δn. This reduction in the holding current I is preferably configured in the form of a negatively falling ramp 58 as a function of the rotational speed. The slope of the ramp 58 can be determined as a quotient of a parametrizable current difference ΔI from a parametrizable rotational speed difference Δn.

In a further embodiment of the invention, it can be provided to undertake the reduction in the holding current in steps 57. A current reduction of, for example, 1 mA to 10 mA can be provided here per step. A step 57 is preferably held for a period of at least 5 ms.

By means of the predetermined reduction in the holding current I, when a limit value of the operating parameter of the combustion engine 2 is reached, for example the slowing-down speed or the amplitude of the generator voltage $U_G$, it can be achieved that the triggering of the brake assembly 40 takes place later in time as the combustion engine 2 slows down. This has the advantage, for example, that the rotational speed of the work tool 3 is reduced further, and therefore when the brake assembly 40 is applied, braking of the slowing-down work tool 3 takes place at a lower rotational speed of the tool. The wear of the brake assembly 40 can be reduced.

Since, as the combustion engine 2 slows down, the electrical energy flowing from the generator G to the energy store 44 or to the capacitor 53 becomes smaller than the electrical energy flowing out of the energy store 44 or the capacitor 53 to the electromagnet 30, the charging of the capacitor 53 will drop. If the charging of the capacitor 53 has dropped to such an extent that an—even reduced—holding current I can no longer be maintained, the electromagnet 30 will release or will no longer be able to hold the holding plate 28. The holding plate 28 will pivot the trigger lever 27 in the arrow direction 39 under a resetting force 56 and will thereby release the knee lever arrangement 26. For example, with the release of the knee lever arrangement 26, the support of the brake lever 20 is removed, and therefore the latter can pivot in the arrow direction 22 under the effect of the brake spring 25 and apply a contact force to the second end of the brake band 17 in the arrow direction 32. The brake band 17 is placed against the clutch drum 14 under the effect of the contact force. The brake assembly 40 brakes the work tool 3 and shuts the latter down. This braking action is also referred to as a slowing-down braking action.

By means of the temporary storage of the electrical energy generated by the generator G in an energy store 44, which is expediently configured as a capacitor 53, the electromagnet 30 can also still be energized with a—reduced—holding current I if the generator voltage $U_G$ itself is already too small to maintain a holding current. The energy flowing to the energy store 44 is then smaller than the energy removed from the control unit 51 in order to maintain the holding current I. The holding current I breaks down, and the electromagnet 30 switches off, only when the charging of the capacitor 53 has been used up. This holding time of the electromagnet 30 after the combustion engine 2 is switched off is determined by the capacity of the energy store 44, that is, the capacity of the capacitor 53.

By means of the reduction in the holding current I when the rotational speed n of the combustion engine 2 falls away, the supply of energy to the electromagnet 30 is reduced, and therefore, as the combustion engine 2 slows down, the holding plate 28 and the brake element 41 coupled to the holding plate 28 can be kept released from the drive element 42 for a longer period, that is, the brake assembly 40 remains in the stand-by position. Only when the holding current I has been reduced to such an extent that the holding force 55 becomes less than the resetting force 56 does the brake assembly 40 drop into the braking position. The brake element 41 is placed against the drive element 42 and brakes the work tool 3 to standstill.

It is understood that the foregoing description is that of the preferred embodiments of the invention and that various changes and modifications may be made thereto without departing from the spirit and scope of the invention as defined in the appended claims.

What is claimed is:

1. A work apparatus comprising:
   a work tool;
   a combustion engine for driving said work tool;
   a brake assembly for braking said work tool as said work tool slows down;
   said brake assembly including a brake element for braking said work tool;
   said brake assembly being shiftable between a braking position wherein said brake element brakes said work tool and a standby position wherein said brake element enables movement of said work tool;
   an electromagnet providing a holding force for holding said brake element when said brake assembly is in said standby position;
   an electric generator driven by said combustion engine for generating energy to operate said electromagnet;
   an energy store for intermediately storing said energy generated by said electric generator;
   a control unit configured to take energy from said energy store and supply a holding current (I) to said electromagnet to generate said holding force when said brake assembly is in said standby position; and,
   said control unit being further configured to monitor an operating parameter of said combustion engine after said combustion engine is switched off and to lower said holding current (I) supplied to said electromagnet from said energy store after a limit value of said operating parameter is reached.

2. The work apparatus of claim 1, wherein said operating parameter of the combustion engine is the rotational speed thereof.

3. The work apparatus of claim 1, wherein the operating parameter of the combustion engine is the starting voltage ($U_G$) of said electric generator.

4. A work apparatus comprising:
   a work tool;
   a combustion engine for driving said work tool;
   a brake assembly for braking said work tool as said work tool slows down;
   said brake assembly including a brake element for braking said work tool;
   said brake assembly being shiftable between a braking position wherein said brake element brakes said work tool and a standby position wherein said brake element enables movement of said work tool;
   an electromagnet providing a holding force for holding said brake element when said brake assembly is in said standby position;
   an electric generator driven by said combustion engine for generating energy to operate said electromagnet;
   an energy store for intermediately storing said energy generated by said electric generator;
   a control unit configured to take energy from said energy store and supply a holding current (I) to said electromagnet to generate said holding force when said brake assembly is in said standby position;
   said control unit being further configured to monitor an operating parameter of said combustion engine after said combustion engine is switched off and to lower said holding current (I) supplied to said electromagnet from said energy store after a limit value of said operating parameter is reached; and, wherein said holding current (I) lies within a range of 30 mA to 300 mA.

5. The work apparatus of claim 1, wherein said holding current (I) is reduced as a function of a rotational speed (n) in the form of a negatively falling ramp.

6. The work apparatus of claim 5, wherein said ramp has a slope determined as a quotient of a parametrizable current difference ($\Delta I$) to a parametrizable rotational speed difference ($\Delta n$).

7. The work apparatus of claim 1, wherein said holding current (I) is reduced in steps.

8. The work apparatus of claim 1, wherein said energy store is a capacitor.

9. The work apparatus of claim 1, wherein, after said combustion engine is switched off, the electrical energy flowing to said energy store becomes smaller than the electrical energy flowing out of said energy store to said electromagnet.

10. A work apparatus comprising:
a work tool;
a combustion engine for driving said work tool;
a brake assembly for braking said work tool as said work tool slows down;
said brake assembly including a brake element for braking said work tool;
said brake assembly being shiftable between a braking position wherein said brake element brakes said work tool and a standby position wherein said brake element enables movement of said work tool;
an electromagnet providing a holding force for holding said brake element when said brake assembly is in said standby position;
an electric generator driven by said combustion engine for generating energy to operate said electromagnet;
an energy store for intermediately storing said energy generated by said electric generator;
a control unit configured to take energy from said energy store and supply a holding current (I) to said electromagnet to generate said holding force when said brake assembly is in said standby position;
said control unit being further configured to monitor an operating parameter of said combustion engine after said combustion engine is switched off and to lower said holding current (I) supplied to said electromagnet from said energy store after a limit value of said operating parameter is reached; and,
wherein a predetermined holding time of said electromagnet after said combustion engine is switched off is determined by the capacity of said energy store.

11. The work apparatus of claim 1, further comprising a drive operatively connecting said work tool to said combustion engine; and, said drive including a drive element upon which said brake element of said brake assembly operates.

12. The work apparatus of claim 11, wherein said drive element is the clutch drum of a centrifugal clutch.

13. The work apparatus of claim 11, wherein the brake element acts with the effect of a contact force on said drive element.

14. The work apparatus of claim 13, wherein said brake assembly includes a brake spring to provide said contact force.

* * * * *